No. 788,014. PATENTED APR. 25, 1905.
W. A. BANGS.
TRACTION WHEEL.
APPLICATION FILED DEC. 29, 1904.
2 SHEETS—SHEET 2.
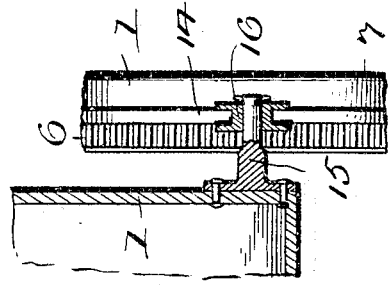
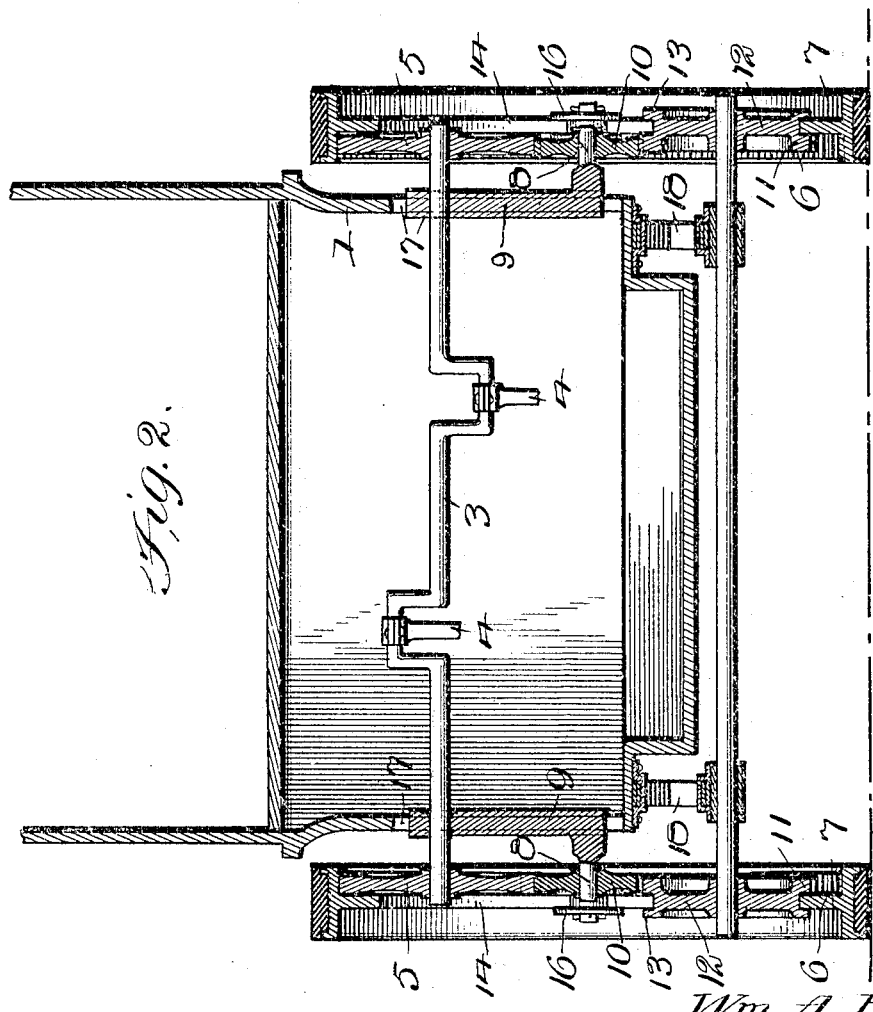
Witnesses
Inventor
Wm. A. Bangs.
By
Attorneys No. 788,014. Patented April 25, 1905.

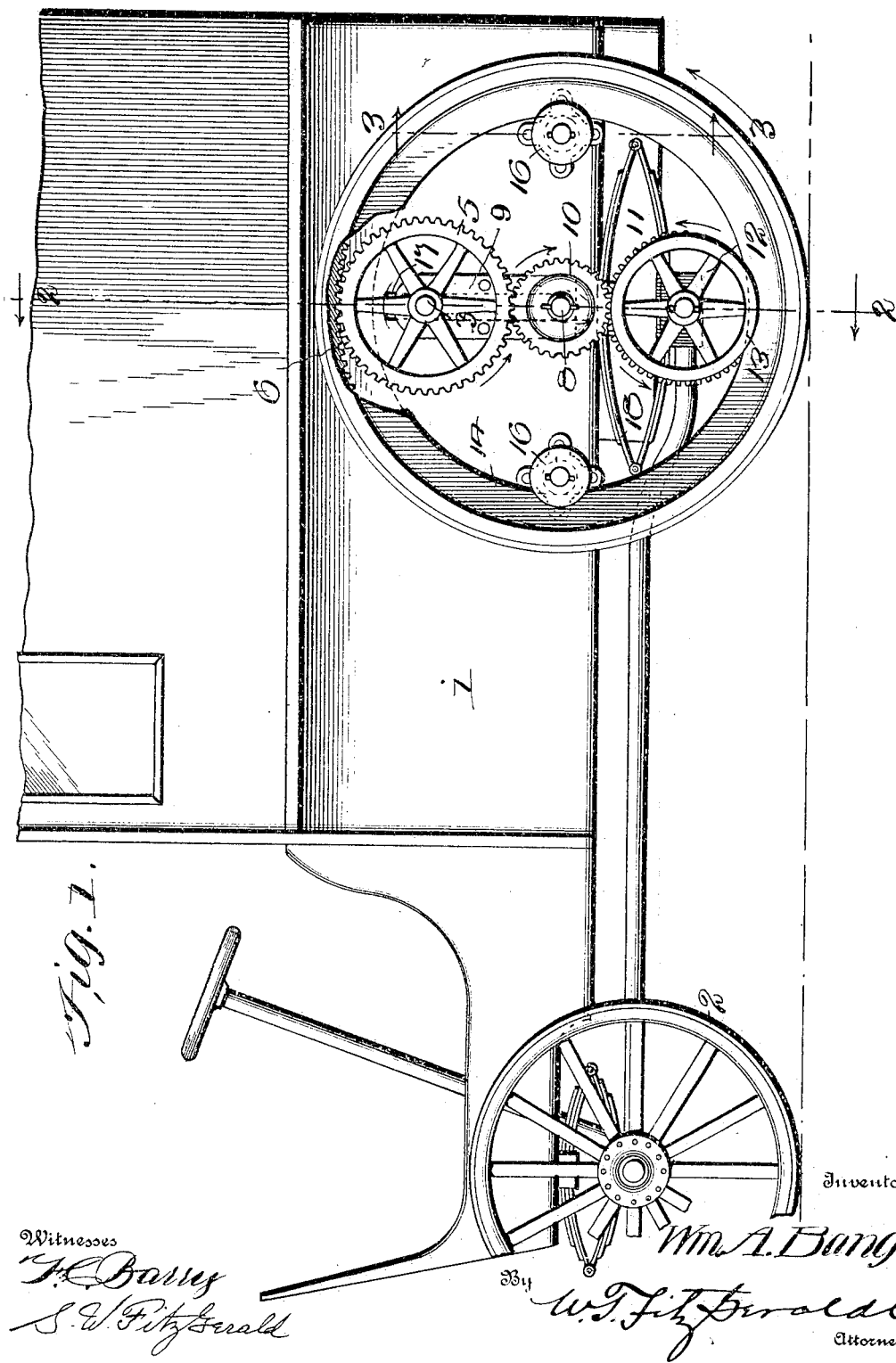

UNITED STATES PATENT OFFICE.

WILLIAM A. BANGS, OF KINGSTON, WISCONSIN.

TRACTION-WHEEL.

SPECIFICATION forming part of Letters Patent No. 788,014, dated April 25, 1905.

Application filed December 29, 1904. Serial No. 238,786.

*To all whom it may concern:*

Be it known that I, WILLIAM A. BANGS, a citizen of the United States, residing at Kingston, in the county of Green Lake and State of Wisconsin, have invented certain new and useful Improvements in Traction-Wheels; and I do hereby declare the following to be a full, clear, and exact description of the invention, such as will enable others skilled in the art to which it appertains to make and use the same.

My invention relates to driving or traction wheels; and it consists of certain novel features of combination and construction of parts the preferred form whereof will be hereinafter clearly set forth, and pointed out in the claim.

The prime object of my invention, among others, is to provide a traction or driving wheel which while especially desirable and efficient for automobiles and the like will be found very useful for all variety of vehicles wherein the motive power is applied to one or more of the carrying-wheels.

A further object of my invention is to provide certain coöperating devices for transmitting the power from the motor of any preferred variety direct to the outer rim or periphery of the carrying or driving wheel.

Other objects and advantages will be hereinafter made clearly apparent, reference being had to the accompanying drawings, which are made a part of this application, and in which—

Figure 1 shows a side elevation of a motor-vehicle with my improved traction-wheel applied to use thereon, it being understood that the outer part of the casing inclosing the power-transmitting wheels is removed. Fig. 2 is a sectional view of Fig. 1 on line 2 2. Fig. 3 is a sectional view of Fig. 1 on line 3 3.

For convenience of reference to the various parts of my invention and coöperating accessories numerals will be employed, the same numeral applying to a similar part throughout the several views, and, referring to the numerals on the drawings, 1 designates the body portion of a motor-vehicle of the usual or any preferred construction, while 2 designates the front carrying-wheels provided with suitable steering apparatus, as is common, whereby the motor-vehicle may be readily guided from place to place.

3 designates the crank-shaft to which the power from the motor is applied, as sprocket-chains passing around suitable wheels on the shaft 3. (Not shown.) The crank-shaft 3 is of sufficient length to have both ends thereof protrude beyond the body portion, as shown in Fig. 2, and to the extended ends of said shaft I fixedly secure the gear-wheels 5, which are disposed in mesh with the plurality of cogs 6 on the inner rim of the wheel 7, the periphery of said rim or wheel being provided with any suitable form of tire, pneumatic or otherwise, as preferred. I also provide the stub-shaft 8, attached in any suitable manner to a plate 9, and upon said shaft I rotatably mount the idler or transmitting gear 10, which is disposed in mesh with the inner flange 11 of the wheel 12, said wheel 12 also having an outer flange 13, properly separated from the inner flange 11, whereby the annular rib 14 will be received between the same, and thereby insure that the wheel 12 will travel around upon said rib 14 and serve to reliably hold the wheel or rim 7 in position. I also provide, as shown in Fig. 3, the auxiliary stub-shafts 15, bolted or otherwise rigidly secured to a contiguous part of the casing 1, and upon said shaft I rotatably mount the grooved wheels 16, the flanges of which receive between them the rib 14, thereby insuring that the wheel or rim 7 will be reliably held in position, whereby the driving-gear 5 will travel upon the cogway 6, and thereby drive the wheel or rim 7 in either direction, it being understood that suitable reversing mechanism shall be provided for the motor, as is obvious. The outer ends of the shaft 3 pass through the upper ends of the plates 9, said plates being slidingly mounted in suitable compensating-slots 17, cut in the sides of the body 1, whereby the resiliency of the springs 18 may be utilized.

It is obvious that the flanges on the wheels 12 and 16 will so reliably engage the flange or rib 14 upon the wheel or rim 7 that said wheel will be held in an upright position and will be continuously driven in either direction, the power being applied at the upper part of the wheel or rim 7 through the mediation of the driving-gear 5, as will be readily understood.

While I have not shown a compensating-gear for the rear wheels, I desire it to be understood that the same may be used if found expedient.

It will thus be seen that I have provided reliably efficient traction-wheels and driving mechanism therefor and that the various parts of my invention may be cheaply and expeditiously manufactured and each readily assembled in its respective operative position, and while I have described the preferred combination and construction of parts I desire to comprehend in this application all substantial equivalents and substitutes that may be considered as fairly falling within the scope and purview of my invention.

Having thus fully described my invention, what I claim as new, and desire to secure by Letters Patent, is—

The herein-described traction or carrying wheel and means to actuate the same, comprising the wheels or rims 7, each having upon its inner face a plurality of cogs and also having an inwardly-projecting rib 14, in combination with a driving-gear 5 meshing with said cogs and operatively connected with the motor, a gear 12 having a pair of separated flanges to receive said rib 14 between them, one of said flanges having a plurality of cogs or teeth; an idler-gear 10 serving as an intermediary between said driving-gear and the gear 12; suitable means to mount the gears 12 and hold the same in engagement with said rib and additional means coöperating with the rib 14 to secure the same against lateral movement whereby said rim or wheel 7 may be continuously or intermittently driven in either direction, all combined substantially as specified and for the purpose set forth.

In testimony whereof I have signed my name to this specification in the presence of two subscribing witnesses.

WILLIAM A. BANGS.

Witnesses:
J. WARNER BANGS,
W. R. SIMS.